United States Patent [19]

Yoshimura et al.

[11] Patent Number: 4,806,758
[45] Date of Patent: Feb. 21, 1989

[54] RADIATION IMAGE READ-OUT APPARATUS

[75] Inventors: Ryoichi Yoshimura; Tsutomu Kimura, both of Kanagawa, Japan

[73] Assignee: Fuji Photo Film Co., Ltd., Kanagawa, Japan

[21] Appl. No.: 32,696

[22] Filed: Apr. 1, 1987

[30] Foreign Application Priority Data

Apr. 1, 1986 [JP] Japan ................ 61-75075

[51] Int. Cl.⁴ ............ B65H 5/00; B65H 7/00
[52] U.S. Cl. ................. 250/327.2; 271/3.1; 271/149; 271/293
[58] Field of Search ........... 250/327.2, 484.1; 271/293, 149, 3.1, 184

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,387,428 | 6/1983 | Ishida et al. | 364/414 |
| 4,678,180 | 7/1987 | Tamura et al. | 271/296 |

FOREIGN PATENT DOCUMENTS 0011395 2/1981 Japan ................ 250/327.2

Primary Examiner—Janice A. Howell
Assistant Examiner—Constantine Hannaher
Attorney, Agent, or Firm—Sughrue, Mion, Zinn, Macpeak, and Seas

[57] ABSTRACT

An apparatus for reading out a radiation image stored on a stimulable phosphor sheet comprises a read-out section, a monitor for reproducing a visible radiation image, an erasing section, and a section for releasably holding a magazine housing stimulable phosphor sheets. The apparatus also comprises a first conveyance system for conveying the stimulable phosphor sheets fed out of the magazine to the read-out section, a stacker disposed at the first conveyance system between the magazine holding section and the read-out section, for housing the stimulable phosphor sheets and transferring them one by one to the first conveyance system. A second conveyance system conveys the stimulable phosphor sheets passing through the read-out section to the erasing section, and a third conveyance system returns the stimulable phosphor sheets passing through the read-out section to the stacker. A distributing member distributes the stimulable phosphor sheets passing through the read-out section either to the second conveyance system or to the third conveyance system.

5 Claims, 2 Drawing Sheets

RADIATION IMAGE READ-OUT APPARATUS

BACKGROUND OF THE INVENTION

1. Field of the Invention

This invention relates to a radiation image read-out apparatus comprising a read-out section and an erasing section combined integrally for use in a radiation image recording and reproducing system. This invention particularly relates to a radiation image read-out apparatus wherein the processing time for a plurality of stimulable phosphor sheets can be shortened.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Patent Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to a radiation passing through an object such as the human body to have a radiation image of the object stored thereon, and is then scanned with stimulating rays such as a laser beam which cause it to emit light in proportion to the stored radiation energy. The light emitted by the stimulable phosphor sheet upon stimulation thereof is photoelectrically detected and converted to an electric image signal, and the image signal is used to reproduce the radiation image of the object as a visible image on a recording material such as a photographic film, a display device such as a cathode ray tube (CRT), or the like.

In the aforesaid radiation image recording and reproducing system, the stimulable phosphor sheet is used to temporarily store a radiation image until the sheet is scanned with stimulating rays to read out the radiation image. Therefore, after the radiation image is read out from the stimulable phosphor sheet, radiation energy remaining thereon should be erased before reusing the sheet.

For satisfying this requirement, it has been proposed to provide a radiation image read-out apparatus with a read-out section for reading out an image stored on a stimulable phosphor sheet, and an erasing section for erasing radiation energy remaining on the sheet.

In the proposed radiation image read-out apparatus, stimulable phosphor sheets carrying radiation images stored thereon are fed as housed in a sheet housing means such as a cassette for housing a single sheet or a magazine for housing a plurality of sheets. The stimulable phosphor sheets are then taken one by one out of the sheet housing means, and sequentially conveyed to the read-out section and the erasing section. At the read-out section, preliminary read-out is often carried out for approximately ascertaining the radiation image stored on the stimulable phosphor sheet before the image read-out (final read-out) is conducted for obtaining the image signal for use in reproduction of a visible image. Read-out conditions in the final read-out and/or other conditions are adjusted based on the information obtained by the preliminary read-out.

On the other hand, stimulable phosphor sheets which need not be subjected to the image read-out (final read-out), for example sheets on which image recording was carried out incorrectly, or the sheets other than those carrying a desired image stored thereon among the sheets on which image recording was carried out in different conditions, are often included among the sheets fed to the radiation image read-out apparatus. Particularly in the case where digital subtraction processing of radiation images is carried out, many stimulable phosphor sheets which need not be subjected to the final read-out are often fed to the radiation image read-out apparatus.

In the method of digital subtraction processing of radiation images, two radiation images recorded under conditions different from each other are photoelectrically read out to obtain digital image signals, which are then subjected to subtraction processing with respect to the corresponding picture elements of the images, thereby to obtain a difference signal for forming an image of a specific structure contained in the radiation images. This method makes it possible to reproduce a radiation image of only the specific structure by use of the signal thus obtained Basically, subtraction processing is carried out by either the so-called temporal (time difference) subtraction processing method or the so-called energy subtraction processing method. In the former method, the image of a specific structure is extracted by subtracting the image signal of a radiation image obtained without injection of contrast media from the image signal of a radiation image in which the image of the specific structure is enhanced by the injection of a contrast medium. In the latter method, an object is exposed to radiations having energy distributions different from each other to obtain two radiation images each containing the image of a specific structure recorded on the basis of the intrinsic radiation energy absorption characteristics of the specific structure. Then, the image signals of the two radiation images are weighted appropriately, when necessary, and subjected to subtraction to extract the image of the specific structure. Since subtraction processing is extremely effective for diagnostic purposes in image processings for medical X-ray photographs, it has attracted much attention in recent years, and research has continued to develop improved methods by use of electronic technology.

Subtraction processing wherein stimulable phosphor sheets are used may be carried out by the method as proposed in, for example, Japanese Unexamined patent Publication No. 58(1983)-163340. The proposed method comprises the steps of (i) using two or more stimulable phosphor sheets exhibiting an extremely wide latitude of exposure to a radiation, (ii) exposing the stimulable phosphor sheets to the radiation passing through the same object under different conditions, i.e. with and without the injection of contrast media to the object, to have radiation images of the object stored on the stimulable phosphor sheets, image information of the object portion injected with contrast media being different between the radiation images, (iii) detecting the radiation images by scanning the stimulable phosphor sheets with stimulating rays to obtain digital image signals, and (iv) carrying out digital subtraction processing by use of the digital image signals.

When the aforesaid subtraction processing is carried out, the image recording portion of the object is injected with contrast media in the course of image recording, and image recording is conducted many times as the contrast media diffuse through the image recording portion of the object. A plurality of the stimulable phosphor sheets each carrying a radiation image stored thereon in this manner are housed in a magazine or the like, fed to the radiation image read-out apparatus, and sent to the image read-out step one by one. In this case, only the stimulable phosphor sheet carrying a radiation image stored thereon before injection of contrast media and the stimulable phosphor sheet carrying a radiation image stored thereon after contrast media have diffused in the manner most suitable for carrying out subtraction processing are actually used for subtraction processing, and the other sheets are unnecessary for subtraction processing. Therefore, it is necessary to select the two stimulable phosphor sheets which are to be used for subtraction processing from many sheets on which image recording was conducted. For this purpose, all of the radiation images stored on the stimulable phosphor sheets must be reproduced into visible images. However, with the conventional radiation image read-out apparatus wherein the image-recorded stimulable phosphor sheets are sent one by one to the read-out section and the preliminary read-out and the final read-out are conducted on the respective sheets, the two sheets which are to be used for subtraction processing cannot be selected until the final read-out is finished for all of the sheets, and a long time is taken for selecting the two desired sheets. Also, since the final read-out is carried out also for the sheets which are unnecessary for subtraction processing, much energy is consumed unnecessarily for producing stimulating rays or the like.

SUMMARY OF THE INVENTION

The primary object of the present invention is to provide a radiation image read-out apparatus wherein image read-out and erasing are carried out in the same apparatus, and image-recorded stimulable phosphor sheets necessary for final read-out are quickly discriminated from the sheets unnecessary for the final read-out so that the final read-out is carried out only for the necessary sheets.

Another object of the present invention is to provide a radiation image read-out apparatus which markedly increases the processing speed and eliminates the problem that energy is consumed unnecessarily for producing stimulating rays or the like.

The specific object of the present invention is to provide a radiation image read-out apparatus which is suitable particularly for subtraction processing.

The present invention provides a radiation image read-out apparatus comprising:

(i) a read-out section for reading out a radiation image stored on a stimulable phosphor sheet, (ii) a monitor for reproducing said radiation image read out at said read-out section into a visible image, (iii) an erasing section for erasing radiation energy remaining on said stimulable phosphor sheet after image read-out from said stimulable phosphor sheet is finished, (iv) a sheet housing means holding section for releasably holding a sheet housing means capable of housing said stimulable phosphor sheet or stimulable phosphor sheets therein, and provided with a take-out means for taking said stimulable phosphor sheets one by one out of said sheet housing means, (v) a first conveyance means for conveying said stimulable phosphor sheet fed out of said sheet housing means holding section to said read-out section, (vi) a stacker for housing a plurality of said stimulable phosphor sheets and transferring said housed stimulable phosphor sheets one by one to said first conveyance means, said stacker being disposed at said first conveyance means between said sheet housing means holding section and said read-out section, (vii) a second conveyance means for conveying said stimulable phosphor sheet, which has passed through said read-out section, to said erasing section, (viii) a third conveyance means for returning said stimulable phosphor sheet, which has passed through said read-out section, to said stacker, and (ix) a distribution means for distributing said stimulable phosphor sheet, which has passed through said read-out section, either to said second conveyance means or to said third conveyance means.

With the radiation image read-out apparatus in accordance with the present invention, the monitor is connected to the read-out section for immediately reproducing the radiation image read out from the stimulable phosphor sheet at the read-out section into a visible image. Also, the third conveyance means and the stacker are disposed, and the sheet distribution means is provided so that the stimulable phosphor sheet passing through the read-out section can be transferred to the third conveyance means for returning the sheet into the stacker. Therefore, it is possible to first carry out the preliminary read-out for all of the stimulable phosphor sheets fed to the apparatus, quickly select the sheets necessary for he final read-out by reproducing the information obtained by the preliminary read-out into a visible image on the monitor, return the sheets into the stacker, and then carry out the final read-out only for the sheets on which the final read-out is to be conducted. Accordingly, the time required for selection of the stimulable phosphor sheets necessary for the final read-out becomes short. Particularly in the case where subtraction processing is conducted in the apparatus, since selection of the stimulable phosphor sheets which are to be subjected to the final read-out and discrimination whether the image recording was satisfactory or not can be achieved quickly, it is possible to shorten the time for which the object is bound, and to markedly increase the processing speed as a whole. Also, since the read-out system is prevented from being operated for the stimulable phosphor sheets which need not be subjected to the final read-out, it is possible to eliminate the problem that energy is consumed unnecessarily for producing stimulating rays or the like.

DESCRIPTION OF THE PREFERRED EMBODIMENTS

The present invention will hereinbelow be described in further detail with reference to the accompanying drawings.

Figure 1:
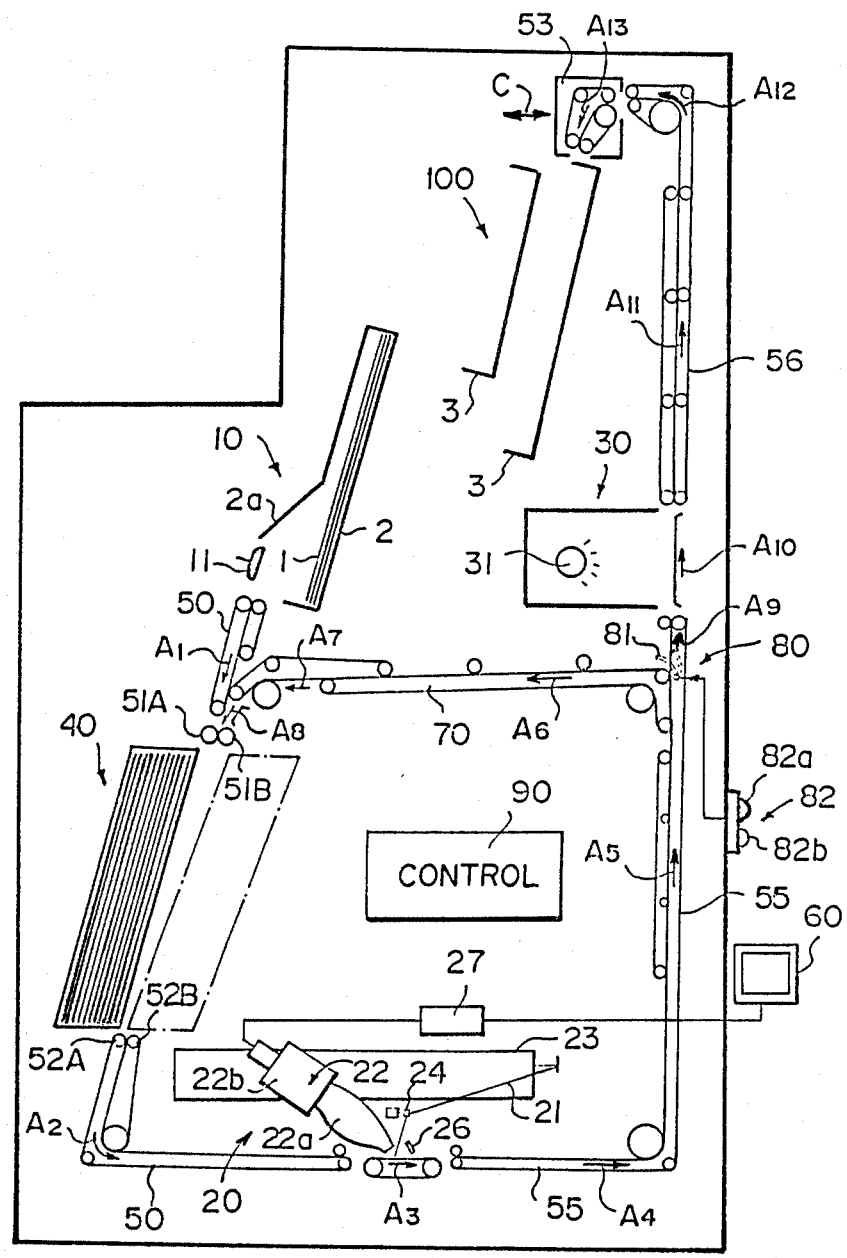
FIG. 1 is a schematic side view showing an embodiment of the radiation image read-out apparatus in accordance with the present invention.

Referring to FIG. 1, an embodiment of the radiation image read-out apparatus in accordance with the present invention comprises a sheet housing means holding section 10 for releasably holding a magazine 2 capable of housing a plurality of stimulable phosphor sheets 5 (hereinafter simply referred to as sheets) 1, 1, ... and acting as a sheet housing means, a read-out section 20 for reading out a radiation image stored on each of the sheets 1, 1, ..., and an erasing section 30 for erasing radiation energy remaining on the sheet 1 after image read-out is conducted on the sheet 1. This embodiment is also provided with a first sheet conveyance means 50 for receiving the sheet 1 taken out of the magazine 2 and conveying it to the read-out section 20, and a second sheet conveyance means 55 for conveying the sheet 1, which has passed through the read-out section 20, to the erasing section 30.

The embodiment of FIG. 1 is constituted for carrying out image read-out from the sheets 1, 1, ... on which image recording has been conducted in a separate image recording apparatus (not shown) by use of contrast media for the purpose of subtraction processing. The magazine 2 housing approximately ten image-recorded sheets 1, 1, ... is fed to the sheet housing means holding section 10. Two sheets 1, 1 which are to be used for subtraction processing are selected from the sheets 1, 1, ... fed to the sheet housing means holding section 10, and image read-out (final read-out) is carried out only for the two selected sheets 1, 1. When the magazine 2 is fed to the sheet housing means holding section 10, a cover member 2a of the sheet housing means holding section 10 is opened as shown in FIG. 1, a suction cup 11 acting as a sheet take-out means disposed at the sheet housing means holding section 10 is moved into the magazine 2 to suck up the sheets 1, 1, ... one by one, and transfers them to the first sheet conveyance means 50 in the vicinity of the suction cup 11.

Figure 2:
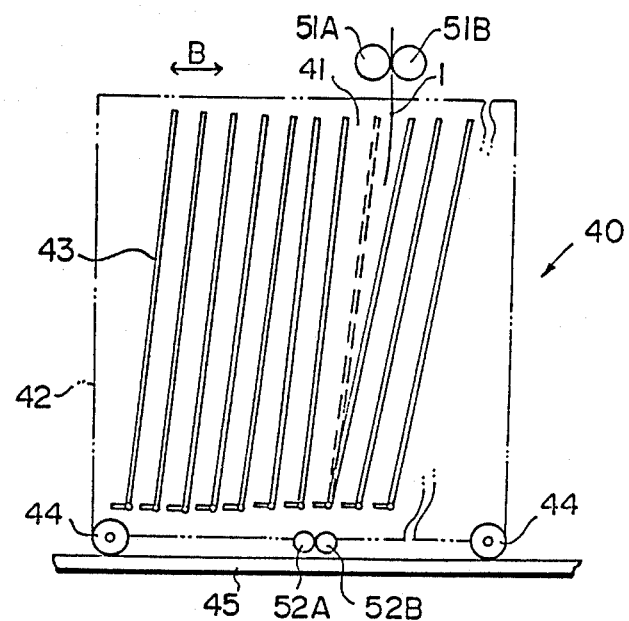
FIG. 2 is a side view showing the configuration of the stacker in the embodiment of FIG. 1.
Figure 3:
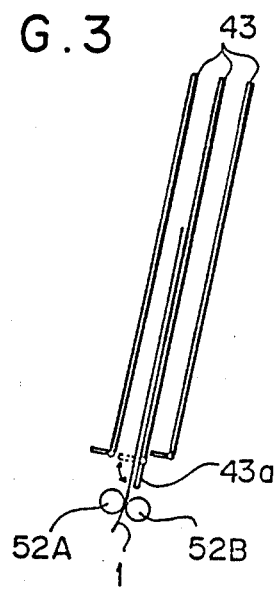
FIG. 3 is an explanatory view showing feeding of the stimulable phosphor sheet out of the stacker.

As shown in FIG. 1, the sheet 1 taken out of the magazine 2 as mentioned above is conveyed by the first sheet conveyance means 50 in the direction as indicated by the arrow A1. A stacker 40 comprising a plurality of sheet housing compartments 41, 41, ... for respectively housing a single sheet 1 therein is disposed at a part of the first sheet conveyance means 50 between the sheet housing means holding section 10 and the read-out section 20. The stacker 40 temporarily houses the sheet 1 conveyed out of the sheet housing means holding section 10. As shown in FIG. 2, at the stacker 40, a plurality of trays 43, 43, ... each for supporting a single sheet 1 are disposed in equally spaced and parallel relation to each other in a case 42 constituted by four side walls. The trays 43, 43, ... are inclined to face upward. Each of the trays 43, 43, ... has an L-shaped cross-section, and the space defined by the tray 43 constitutes one sheet housing compartment 41. The case 42 supporting the plurality of trays 43, 43, ... is moved by a drive mechanism such as a motor (not shown) in the direction as indicated by the arrow B, as wheels 44, 44, ... provided at the lower end portion of the case 42 move along rails 45, 45. In this manner, the case 42 is moved in the direction as indicated by the arrow B until a predetermined tray 43 is positioned under feed-in rollers 51A and 51B for feeding the sheet 1 into the stacker 40. Then, the inclination of the tray 43 is changed from the position as indicated by the broken line in FIG. 2 to the position as indicated by the solid line so that the space at the upper end portion of the tray 43 is increased for facilitating the feeding of the sheet 1 into said tray 43. The sheet 1 is fed by the feed-in rollers 51A and 51B into the tray 43 whose inclination has been changed in this manner. When the feeding of the sheet 1 into the tray 43 is finished, the tray 43 is returned to the original inclination, and the case 42 is moved in the direction as indicated by the arrow B for allowing the feeding of the next sheet 1 into a different tray 43. When the sheet 1 is to be fed out of the stacker 40, the case 42 is moved in the direction as indicated by the arrow B until the predetermined tray 43 supporting the sheet 1 which is to be fed out is positioned above feed-out rollers 52A and 52B disposed below the stacker 40. As shown in FIG. 3, a bottom plate 43a of the tray 43 is rotated from the position as indicated by the broken line to the position as indicated by the solid line, and the sheet 1 is allowed to fall from the tray 43. The lower end portion of the sheet 1 thus falling from the tray 43 is grasped between the feed-out rollers 52A and 52B, which feed the sheet 1 out of the stacker 40. The sheet 1 is then conveyed by the first sheet conveyance means 50 in the direction as indicated by the arrow A2 to the read-out section 20.

At the read-out section 20, the sheet 1 carrying a radiation image stored thereon is scanned with stimulating rays 21 such as a laser beam which cause the sheet 1 to emit light in proportion to the stored radiation energy, and the emitted light is photoelectrically detected by a photoelectric read-out means 22 constituted by a photomultiplier or the like to obtain an electric image signal for use in reproduction of a visible image. Reference numeral 23 denotes a stimulating ray source, and reference numeral 24 denotes a light deflector such as a galvanometer mirror. Reference numeral 26 designates a reflection mirror for reflecting the light emitted by the sheet 1 towards a light guide member 22a of the photoelectric read-out means 22. The light guide member 22a guides the light through total reflection therein up to a photodetector 22b constituted by a photomultiplier or the like.

From the sheets 1, 1, ... taken one by one out of the magazine 2 and housed in the stacker 40 as mentioned above, the sheet 1 carrying a radiation image of an object stored thereon before the image recording portion of the object is injected with contrast media and the sheet 1 carrying a radiation image stored thereon in the most suitable image recording condition after contrast media had diffused through the image recording portion of the object in a desirable condition should be selected for use in subtraction processing. Thus only the two sheets 1, 1 are to be subjected to the final read-out at the read-out section 20. Therefore, in this embodiment, the two sheets 1, 1, which are to be subjected to the final read-out are selected by carrying out the preliminary read-out at the read-out section 20 before the final read-out is started. As disclosed in, for example, Japanese Unexamined Patent Publication No. 58(1983)-67240, the preliminary read-out may be conducted by scanning the sheet 1 with stimulating rays having stimulation energy of a level lower than the level of the stimulation energy of the stimulating rays used in the final read-out, and detecting the light emitted by the sheet 1 during the scanning by a photoelectric read-out means. The preliminary read-out from the sheet 1 at the read-out section 20 will be described hereinbelow.

The sheet 1 sent to the read-out section 20 is conveyed by the first sheet conveyance means 50 in the direction as indicated by the arrow A3, and scanned twodimensionally by the stimulating rays 21 for the preliminary read-out deflected approximately normal to the conveyance direction and having a low level of stimulation energy. In this manner, the radiation image stored on the sheet 1 is read out approximately by the photoelectric read-out means 22. The read-out section 20 is connected to a monitor 60 for reproducing the radiation image read out at the read-out section 20 into a visible image. The radiation image approximately read out by the photoelectric read-out means is reproduced into a visible image on the monitor 60 via an image processing section 27. The sheets 1, 1, ... fed out of the stacker 40 are sequentially sent to the read-out section 20, and the preliminary read-out is carried out for all of the sheets 1, 1, ... sent to the read-out section 20. The radiation images thus read out preliminarily are sequentially reproduced into a visible image on the monitor 60. Therefore, when the preliminary read-out is finished for all of the sheets 1, 1, ... sent to the read-out section 20, it is possible to discriminate whether the image recording was satisfactory or not and to select the sheets 1, 1 for which the final read-out is to be carried out.

After the preliminary read-out from the sheet 1 is finished at the read-out section 20, the sheet 1 is conveyed by the second sheet conveyance means 55 in the directions as indicated by the arrows A4 and A5. A third sheet conveyance means 70 for returning the sheet 1 to the stacker 40 is connected to the second sheet conveyance means 55 between the read-out section 20 and the erasing section 30. At the connecting section, a distribution means 80 is disposed for distributing the sheet 1 passing through the read-out section 20 either to the second sheet conveyance means 55 or to the third sheet conveyance means 70. The distribution means 80 comprises a distributing member 81 movable between a first position as indicated by the solid line and a second position as indicated by the broken line, and a control means 82 connected to the distributing member 81 and provided with a first switch 82a and a second switch 82b. The distributing member 81 is moved to its first position when the first switch 82a is depressed, and to its second position when the second switch 82b is depressed. As long as the sheets 1, 1, ... on which the preliminary read-out has been finished are conveyed out of the read-out section 20, the distributing member 81 is maintained at its first position and distributes the sheets 1, 1, ... to the third sheet conveyance means 70. The third sheet conveyance means 70 conveys the sheets 1, 1, ... in the directions as indicated by the arrows A6, A7 and A8, and sequentially feeds the sheets 1, 1, ... into empty trays 43, 43, ... of the sacker 40.

When the preliminary read-out is finished for all of the sheets 1, 1, ... and the sheets 1, 1, ... are housed in the stacker 40, the two sheets 1, 1 selected based on the visible images reproduced on the monitor 60 are fed out of the stacker 40 and sent to the read-out section 20 for carrying out the final read-out. In order to preferentially feed the two selected sheets 1, 1 out of the stacker 40, it is necessary to provide a control means for memorizing the sheets 1, 1, ... housed in the respective trays 43, 43, ... of the stacker 40 and controlling the operation of selectively feeding desired sheets 1, 1 out of the stacker 40 when necessary. For this purpose, in this embodiment, a control section 90 is disposed above the read-out section 20.

The two sheets 1, 1 fed out of the stacker 40 and sent to the read-out section 20 are sequentially conveyed by the first sheet conveyance means 50 in the direction as indicated by the arrow A3. At the read-out section 20, the whole surface of the sheet 1 is two-dimensionally scanned with the stimulating rays 21 which cause the sheet 1 to emit light in proportion to the stored radiation energy, and the emitted light is detected by the photodetector 22b via the light guide member 22a. The image signals detected from the two sheets 1, 1 are sent to the image processing section 27 which carries out digital subtraction between corresponding picture elements of the two sheets 1, 1.

The second switch 82b is depressed to move the distributing member 81 to its second position before the sheets 1, 1 on which the final read-out is finished as mentioned above are conveyed by the second sheet conveyance means 55 in the directions as indicated by the arrows A4 and A5. Therefore, the sheets 1, 1 on which the final read-out is finished are conveyed in the directions as indicated by the arrows A4 and A5, and then in the direction as indicated by the arrow A9 toward the erasing section 30.

At the erasing section 30, radiation energy remaining on the sheet 1 after the image read-out is conducted is erased. Specifically, a part of the radiation energy stored on the sheet 1 at the image recording step remains stored thereon after the image read-out is conducted. In order to reuse the sheet 1, the residual radiation energy is erased at the erasing section 30. In this embodiment, the erasing section 30 is provided with a plurality of erasing light sources 31, 31, ... constituted by fluorescent lamps, tungsten-filament lamps, sodium lamps, xenon lamps, iodine lamps or the like, and the sheet 1 is exposed to the erasing light emitted by the erasing light sources 31, 31, ... for releasing the residual radiation energy from the sheet 1 while the sheet 1 is conveyed in the direction as indicated by the arrow A10. At the erasing section 30, any known erasing method may be used. For example, erasing may be conducted by heating or by a combination of exposure to the erasing light with heating.

After erasing of the residual radiation energy on the sheets 1, 1 is carried out at the erasing section 30, the sheets 1, 1 are sequentially conveyed by a fourth sheet conveyance means 56 in the directions as indicated by the arrows A11 and A12. A tray housing section 100 which houses a plurality of trays 3, 3, ... having different sizes is disposed at the destination of the conveyance by the fourth sheet conveyance means 56. Each of the sheets 1, 1 is fed into a predetermined tray 3 in accordance with the sheet size. Specifically, the end portion of the fourth sheet conveyance means 56 is constituted as a movable conveyance section 53 which is moved in the direction as indicated by the arrow C after grasping the leading end portion of the sheet 1 and feeds the sheet 1 into a predetermined tray 3.

The sheets 1, 1 fed into the trays 3, 3 as mentioned above are taken out of the radiation image read-out apparatus in the form housed in the trays 3, 3, and sent to a separate image recording apparatus for reuse in radiation image recording. On the other hand, a plurality of the sheets 1, 1, on which only the preliminary read-out was carried out remain in the stacker 40. The sheets 1, 1, ... may be taken out of the stacker 40 when not busy, passed through the read-out section 20 without carrying out the final read-out, and sent to the erasing section 30. Thus the sheets 1, 1, ... may be subjected only to the erasing, and fed into the trays 3, 3, . . . In this case, the final read-out at the read-out section 20 is carried out only for the aforesaid two sheets 1, 1, and it is possible to eliminate the problem that stimulating rays are unnecessarily produced for the sheets 1, 1, ... for which the final read-out need not be carried out.

With the aforesaid embodiment, it is possible to quickly select the two sheets 1, 1 necessary for subtraction processing by first carrying out the preliminary read-out for all of the sheets 1, 1, ... fed to the radiation image read-out apparatus and reproducing the information obtained by the preliminary read-out on the monitor 60. Also, since the sheets 1, 1, ... for which the final read-out need not be carried out may be merely passed through the read-out section 20 without conducting the final read-out, energy is not consumed unnecessarily for producing stimulating rays. Further, since the conveyance speed for the sheets 1, 1, . . . for which the final read-out need not be carried out can be increased in the read-out section 20, it is possible to shorten the time taken for processing of all of the sheets 1, 1, ... fed to the apparatus. In the aforesaid embodiment, all of the sheets 1, 1, ... for which the preliminary read-out is carried out at the read-out section 20 are sent to the second sheet conveyance means 55. However, in the case where the information obtained by the preliminary read-out can be reproduced on the monitor before the sheet 1 subjected to the preliminary read-out at the read-out section 20 arrives at the distribution means, and said sheet 1 is discriminated to be unnecessary for the final read-out without comparison with a radiation image stored on the other sheets 1, 1, ..., the distributing member 81 may be moved each time the sheet 1 is conveyed, and the sheets 1, 1, ... discriminated to be unnecessary for the final read-out may be directly sent to the erasing section 30 without being returned to the stacker 40. Also, the stacker 40 is constituted so that the feeding-in and feeding-out of the sheet 1 is possible for an arbitrarily selected tray. In the case where the stacker 40 constituted in this manner is used, the sheet 1 necessary for the final read-out can be selected and sent to the read-out section 20. However, the stacker 40 may also be constituted so that the feeding-in and feeding-out of the sheets 1, 1, ... are effected sequentially from a tray at one end of the stacker 40. In this case, the sheets 1, 1, ... on which the preliminary read-out is finished are fed out of the stacker 40 sequentially from the tray at one end of the stacker regardless of whether the final read-out is to be carried out for the sheets 1, 1, ..., and when a sheet 1 unnecessary for the final read-out is conveyed to the read-out section 20, emission of the stimulating rays 21 may be ceased, and said sheet 1 may be merely passed through the read-out section 20 without carrying out image read-out. In other words, the stimulating rays 21 can be emitted and the read-out system of the read-out section 20 can be activated only when the sheet 1 on which the final read-out is to be carried out is conveyed to the read-out section 20. Further, the radiation image read-out apparatus of the present invention is not limited to the application to subtraction processing of images, and is advantageous also in the case where the final read-out is carried out basically for all of the sheets 1, 1, ... fed to the apparatus except for sheets 1 on which the image recording was conducted incorrectly. Specifically, in this case, the preliminary read-out is carried out for all of the sheets 1, 1, ... fed to the apparatus, the sheets 1, 1, ... on which the preliminary read-out is finished are returned to the stacker 40 by the third sheet conveyance means 70, the information obtained by the preliminary read-out is reproduced on the monitor 60 and observed, and the operation of the final read-out system is ceased when a sheet 1 on which the image recording was incorrect is conveyed again to the read-out section 20. The sheets 1, 1, ... fed to the sheet housing means holding section 10 need not necessarily be in the form housed in the magazine 2, and may be in the form respectively housed in cassettes for housing a single sheet 1. A single cassette may be fed to the sheet housing means holding section 10, or a plurality of cassettes may be simultaneously fed thereto.

Also, in the aforesaid embodiment, the distribution means is disposed at an intermediate portion of the second sheet conveyance means 55 for distributing the sheets 1, 1, . . . either to the second sheet conveyance means 55 or to the third sheet conveyance means 70. However, the distribution means may also be disposed just after the read-out section 20, and the second sheet conveyance means 55 and the third sheet conveyance means 70 may be connected to the distribution means just after the read-out section 20 so that the sheets 1, 1, . . . are selectively conveyed to the erasing section 30 or to the stacker 40.

We claim:

1. A radiation image read-out apparatus comprising:
   (i) a read-out section for reading out a radiation image stored on a stimulable phosphor sheet,
   (ii) a monitor for reproducing said radiation image read out at said read-out section into a visible image,
   (iii) an erasing section for erasing radiation energy remaining on said stimulable phosphor sheet after image read-out from said stimulable phosphor sheet is finished,
   (iv) a sheet housing means holding section for releasably holding a sheet housing means capable of housing said stimulable phosphor sheet or stimulable phosphor sheets therein, and provided with a take-out means for taking said stimulable phosphor sheets one by one out of said sheet housing means,
   (v) a first conveyance means for conveying said stimulable phosphor sheet fed out of said sheet housing means holding section to said read-out section,
   (vi) a stacker for housing a plurality of said stimulable phosphor sheets and transferring said housed stimulable phosphor sheets one by one to said first conveyance means, said stacker being disposed at a part of said first conveyance means between said sheet housing means holding section and said read-out section,
   (vii) a second conveyance means for conveying said stimulable phosphor sheet, which has passed through said read-out section, to said erasing section,
   (viii) a third conveyance means for returning said stimulable phosphor sheet, which has passed through said read-out section, to said stacker, and
   (ix) a distribution means for distributing said stimulable phosphor sheet, which has passed through said read-out section, either to said second conveyance means or to said third conveyance means.

2. An apparatus as defined in claim 1 wherein said stacker comprises a plurality of trays disposed parallel to each other in equally spaced relation in a case, a means for widening the space of any one of said trays when said stimulable phosphor sheet is to be fed into said tray, and a means for moving said case housing said trays.

3. An apparatus as defined in claim 2 wherein each of said trays is provided with a bottom plate disposed at the lower end movably between a first position to receive the lower end of said stimulable phosphor sheet and hold the stimulable phosphor sheet in the tray and a second position rotated downward from the first position to allow the stimulable phosphor sheet to fall by its weight and discharge out of the tray.

4. An apparatus as defined in claim 1 wherein said distribution means comprises a distributing member movable between a first position to distribute said stimulable phosphor sheet to said third conveyance means and a second position to distribute said stimulable phosphor sheet to said second conveyance means, and a control means for controlling the movement of said distributing member.

5. An apparatus as defined in claim 1 further comprising a fourth conveyance means for conveying said stimulable phosphor sheet passing through said erasing section to a sheet housing section for housing the erased and reusable stimulable phosphor sheet.

* * * * *